(12) United States Patent
Rotole

(10) Patent No.: US 6,957,835 B2
(45) Date of Patent: Oct. 25, 2005

(54) DEVICE FOR ADJUSTING THE SPACE BETWEEN ADJACENT KNOTTER ASSEMBLIES ON A KNOTTER DRIVE SHAFT

(75) Inventor: David Vincent Rotole, Ottumwa, IA (US)

(73) Assignee: Deere & Company, Moline, IL (US)

( * ) Notice: Subject to any disclaimer, the term of this patent is extended or adjusted under 35 U.S.C. 154(b) by 47 days.

(21) Appl. No.: 10/719,096

(22) Filed: Nov. 21, 2003

(65) Prior Publication Data

US 2005/0110276 A1  May 26, 2005

(51) Int. Cl.⁷ ............................................. A01D 59/04
(52) U.S. Cl. ........................................ 289/2; 100/29
(58) Field of Search ............................ 289/1.2, 1.5, 2, 289/14, 18.1; 100/29

(56) References Cited

U.S. PATENT DOCUMENTS

| | | | | |
|---|---|---|---|---|
| 4,022,121 A | | 5/1977 | Crawford et al. ............. | 100/29 |
| 4,540,199 A | * | 9/1985 | Neill ............................ | 285/27 |
| 4,783,119 A | * | 11/1988 | Moses .................... | 297/215.14 |
| 4,927,305 A | * | 5/1990 | Peterson, Jr. ................. | 411/14 |
| 6,164,197 A | | 12/2000 | Prellwitz ..................... | 100/20 |
| 6,263,764 B1 | * | 7/2001 | Steinbock .................. | 81/57.38 |

* cited by examiner

Primary Examiner—Gary L. Welch

(57) ABSTRACT

A knotter arrangement for a large rectangular or square baler includes a plurality of knotter assemblies mounted on a knotter drive shaft. Each knotter assembly includes a knotter drive gear mounted for rotation with, and axial movement along, the knotter drive shaft, and a knotter frame having a sleeve clamped loosely on a hub of an associated knotter drive gear. According to a first embodiment, a pair of jackbolts are screwed into one end of the hub of one knotter drive gear, with the heads of the pair of jackbolts engaging an end of the hub of an adjacent knotter drive gears. In second and third embodiments, for use with knotter drive gears having small diameter hubs, the jackbolts are respectively mounted in either an end face of a spacer mounted on the shaft between adjacent knotter assemblies, or in an end face of a sleeve of the mounting frame that surrounds an elongate section of the drive gear hub. In a fourth embodiment, the spacer includes an internally threaded counterbore which is received on a threaded end of the drive gear hub. In all embodiments, axial spacing between the adjacent knotter assemblies may be accomplished by adjustment of the axially threaded member, i.e., the threaded jackbolt or spacer.

10 Claims, 2 Drawing Sheets

DEVICE FOR ADJUSTING THE SPACE BETWEEN ADJACENT KNOTTER ASSEMBLIES ON A KNOTTER DRIVE SHAFT

FIELD OF THE INVENTION

The present invention relates to devices for adjusting the space between adjacent knotter assemblies on a knotter drive shaft.

BACKGROUND OF THE INVENTION

A conventional twine tying or knotter arrangement of a rectangular baler includes a plurality of knotter assemblies or devices mounted in side-by-side relationship along a knotter drive shaft, with the number of knotter assemblies being equal to the number of loops of twine to be tied around a bale, and with the number of loops of twine being dependent upon the size of the bale being produced. Each knotter assembly includes a knotter frame, which carries various knotter components, and a knotter drive gear. The knotter frame is either mounted on the knotter drive shaft adjacent an associated knotter drive gear or mounted on a hub of the associated drive gear, the latter being an intermittent gear having gear segments respectively located for meshing with driven gears of selected knotter components, and having cam surfaces for engaging cam rollers or followers for controlling movement of other knotter components. In both cases the knotter frame remains fixed while the knotter drive shaft or drive gear hub rotates freely within a sleeve or eye of the knotter frame. Correct positioning between the drive gear and driven components carried by the knotter frame is achieved by using shims, spacers, and other devices for retaining an adjusted position. U.S. Pat. No. 6,164,197 discloses an arrangement wherein the knotter frame is mounted on an elongate hub of the knotter drive gear and is held in an adjusted location relative to the knotter gear by a nut threaded onto the free end of the hub. In addition, these balers are normally provided with a device for adjusting the lateral space between adjacent knotter assemblies on the knotter drive shaft. Such adjustment is necessary so that the knotter assemblies are in proper alignment with the twine-delivery needles and the knotter table.

One known way of adjusting the lateral spacing between adjacent knotter assemblies is done by providing at least a pair of shims or spacers in the form of tapered rings mounted in engagement with each other on the drive shaft between the knotter assemblies. Desired spacing of the knotter assemblies is achieved by releasably securing the tapered rings together in desired angular positions relative to each other by using set screws or by using wire ties that are woven between radial pegs respectively carried by the pair of tapered rings. Such an arrangement for securing the rings together is not easy to release and reapply nor is it easy to turn the rings relative to each other once released, especially when the parts have been operating in the dirty environment present on a baler. Furthermore, the tapered shims or spacers are somewhat costly to manufacture. U.S. Pat. No. 4,022,121 shows an example of tapered rings, which are retained in adjusted positions by set screws and are provided with radial holes into which a tool may be inserted for rotating the rings relative to each other on the knotter drive shaft.

SUMMARY OF THE INVENTION

According to the present invention, there is provided a novel manner of adjusting the spacing between adjacent knotter assemblies, which include knotter drive gears having hubs keyed for rotation with, and axial movement along, the knotter drive shaft and knotter component support frames mounted either on the drive shaft or on the hub of the knotter drive gear.

An object of the invention is to provide an effective adjusting device between opposed faces of adjacent knotter assemblies, with the adjustment device being easily adjustable using simple tools, and being relatively inexpensive.

This object is accomplished, according to one embodiment, and is applicable when the knotter support frame is mounted on the knotter drive gear hub by providing at least one threaded tapped hole in one axial face of each knotter drive gear hub and by providing a jackbolt screwed into each tapped hole and having a head positioned in engagement with an end face of the hub of the adjacent knotter drive gear. Spacing adjustments then are made, during assembly of the knotter drive gears on the knotter shaft by merely screwing the jackbolt in one direction to advance it into the hub or in the opposite direction to withdraw it from the hub. A jam nut is provided to lock the jackbolt in place.

According to a second embodiment, especially for use with drive gears including hubs having a small outer diameter that make it impractical or impossible to use a jackbolt, the object is accomplished by using a spacer having an outer diameter greater than that of the gear hubs and positioning the spacer on the knotter drive shaft between adjacent knotter assemblies, the spacer having a first end face abutting an end face of one knotter assembly and having a second face which is counterbored to fit over the hub of the drive gear of the other knotter assembly, this second face containing at least one threaded bore in which a jackbolt, having a head engaged with an axially facing surface of the other knotter assembly, is located. Again, the jackbolt may be screwed one way or the other in the threaded bore to effect an adjustment in the spacing between the adjacent knotter assemblies.

The object is accomplished, according to a third embodiment, again especially for use with drive gears including small diameter hubs, by mounting the jackbolts in threaded holes provided in the knotter component support frame of one knotter assembly, with the heads of the jackbolts being engaged with a surface of the drive gear of the adjacent knotter assembly.

The object is accomplished, according to a fourth embodiment, by using a spacer similar in most respects to that of the second embodiment; however, instead of carrying a jackbolt, the counterbored portion of the spacer is provided with internal threads that are engaged with external threads provided on the hub of the drive gear of one of the knotter assemblies. Flats are provided on the spacer for being engaged with a tool, and a jam nut is provided on the threaded hub for securing the spacer in selected axial positions so as to effect adjustment of the spacing between the adjacent knotter assemblies.

This and other objects of the invention will become apparent from a reading of the ensuing description together with the appended drawings.

DESCRIPTION OF THE PREFERRED EMBODIMENT

Figure 1:
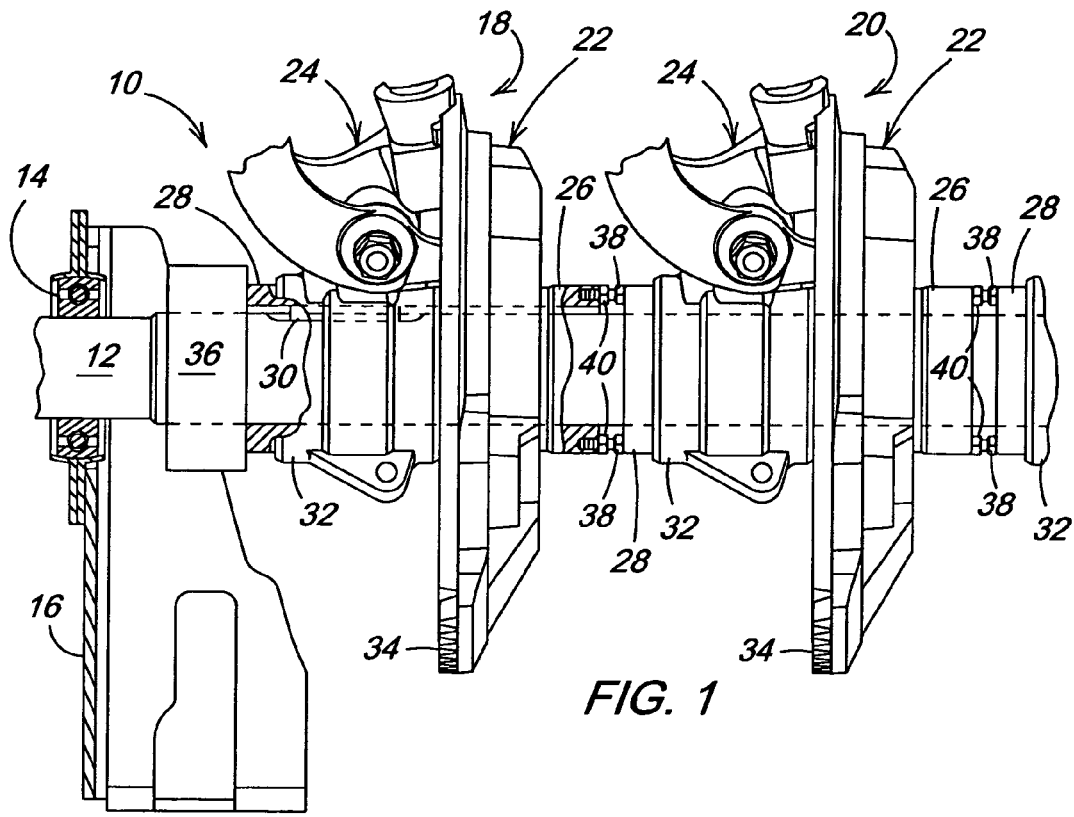
FIGS. 1–4 are somewhat schematic views each showing a knotter drive shaft on which a plurality of knotter assemblies are mounted for axial adjustment respectively by four different embodiments of the invention.

Referring now to FIG. 1, there is shown a portion of a knotter mechanism 10 including a knotter drive shaft 12 having opposite end sections respectively supported in bearings 14 (only one shown) mounted to laterally spaced walls 16 of a baler frame of a large rectangular or square baler. Mounted on the shaft 12 are a plurality of identical knotter drive assemblies of which only two are shown at 18 and 20, with it to be understood that the total number of knotter assemblies would normally vary in accordance with the size of bale being produced and would be equal to the total number of loops of twine to be tied about the bale. Each of the knotter assemblies 18 and 20 includes a knotter drive gear 22 and a knotter support frame 24, which is only partly shown, together with the knotter components supported by it.

The knotter drive gears 22 each include a hub, having as viewed in FIG. 1, a relatively short right-hand section 26 and an elongate left-hand section 28. The drive gears 22 are keyed, as at 30, for rotation with, and axial movement along, the drive shaft 12.

The knotter frames 24 each include a split sleeve 32 having opposite halves releasably clamped together about the left-hand hub section 28 of a respective one of the drive gears 22, the sleeve 32 being dimensioned for permitting the hub section to rotate freely within it. It is to be understood that the left-hand hub section 28 of each of the gears 22 could be shortened, in which case the sleeve 32 of each of the knotter frames 24 would be mounted directly onto the shaft 12 so as to permit the shaft to rotate freely within the sleeve. The driven knotter components, not clearly shown, that are carried by each knotter frame each include a driven gear or a cam follower respectively located for meshing with various gear segments, or for engaging cam surfaces of the adjacent gear 22, one gear segment being partly shown at 34.

The knotter assemblies 18 and 20 are spaced equally from each other axially along the shaft 12. Right- and left-hand stop-forming shaft collars 36 are received on the shaft 12 and fixed by any suitable securing arrangement, to locations adjacent left- and right-hand sides of the bale-forming chamber (not shown) of the baler with which the shaft 12 is being used. One example of the construction of the shaft collars would be to construct them of separable halves which are secured together by a pair of bolts passing through aligned holes in the halves located at opposite sides of the shaft 12. It is conceivable that the left-hand collar 36, the only collar shown, could be defined by a shoulder formed on the shaft 12.

The left-hand face of the hub section 28 of the knotter drive gear 22 of the knotter assembly 18 is positioned against the left-hand shaft collar 36. Located at diametrically-spaced locations in the right-hand face of the right-hand hub section 28 of each of the gears 22 is a pair of drilled and tapped or threaded bores in which a pair of jackbolts 38 are respectively received. A jam nut 40 is located on each jackbolt 38 for fixing its axial position within its associated tapped or threaded bore. In lieu of the jam nut 40, a locking device (not shown), including a tab movable to and from contact with the head of the jackbolt 38, could be used to prevent its movement once adjusted. The heads of the jackbolts 38 of the gear 22 of the knotter assembly 18 bear on the left-hand face of the hub section 28 of the gear 22 of the knotter assembly 20, and the heads of jackbolts 38 carried at the right-hand face of the hub section 26 of the drive gear 22 of the knotter assembly 20 bear on the left-hand face of the hub section 28 of the drive gear 22 of the next adjacent knotter assembly, and so on. In arrangements where the knotter frame is mounted on the drive shaft between adjacent knotter gears, the heads of the jackbolts 38 would engage an axial face of the sleeve 32 of the knotter frame. In any event, when the desired number of knotter assemblies are mounted on the shaft, then the right-hand shaft collar 36 (not shown) is fixed on shaft 10 in a position against a right-hand face of the hub section 26 of the right-most knotter drive gear 22. It is conceivable that jackbolts 22 could be mounted in the left-hand face of the hub section 28 of each of the knotter drive gears 22, in which case, the assembly of the gears on the shaft 10 would be from right to left.

It will be appreciated then that the spacing between the adjacent knotter assemblies 18 and 20, and between all other adjacent knotter assemblies, can be adjusted using a simple wrench by first loosening the jam nuts 40 of the jackbolts 38 associated with the gears 22 involved in the adjustment. Then, the jackbolts 38 of one gear 22 are turned in the appropriate direction for the adjustment required while the jackbolts of the other gear 22 are turned the same amount of turns in the opposite direction. The associated jam nuts 40 are then tightened to hold the jackbolts 38 in their adjusted positions. It is conceivable that a pair of jackbolts 38 could be provided in each of the shaft collars 36, and in that way, provide adjustable stops between which the knotter drive gears could be adjusted within the limits of the adjustments of the stops, such a manner of adjustment not requiring removal of the collars 20 once they are installed.

Figure 2:
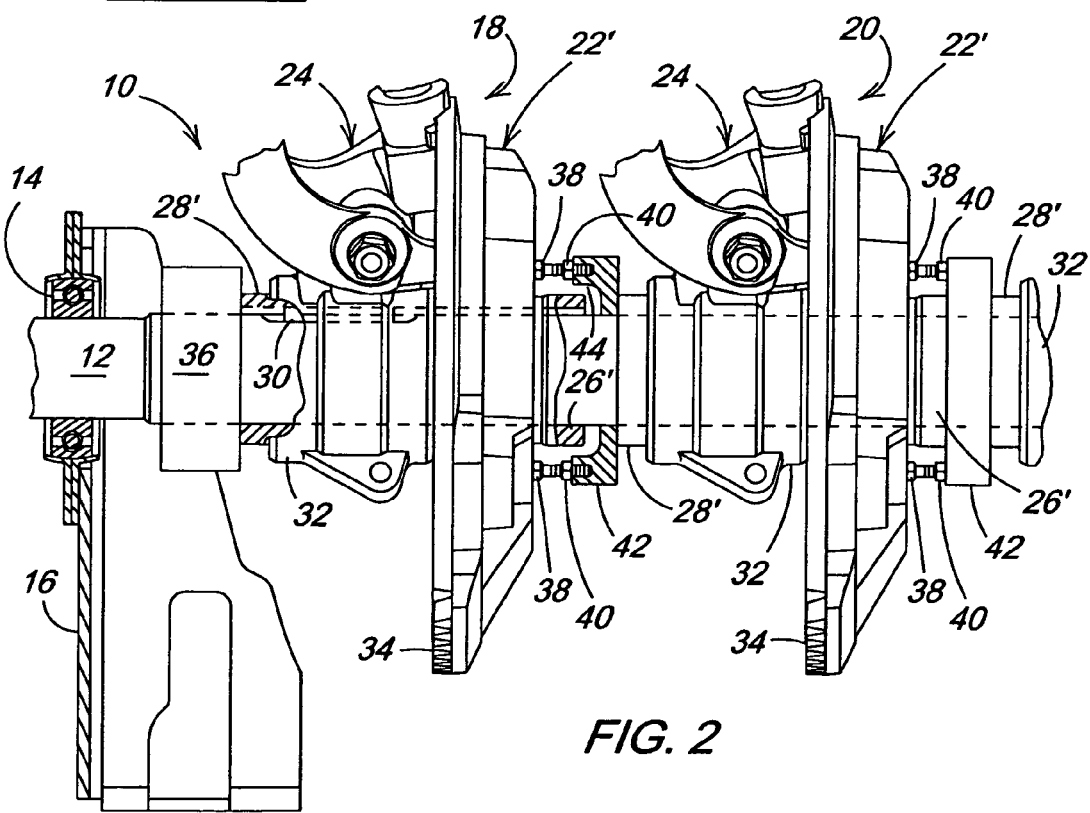

Referring now to FIG. 2, there is shown a second embodiment of the invention where like components are identified with like reference numerals. Thus, the knotter drive shaft 12 carries, from left to right, identical knotter drive gears 22' that differ from the drive gears 22 only in that the outside diameter of their hub sections 26 is too small to contain sufficient material for permitting holes to be drilled and tapped or threaded for receiving the jackbolts 38. A cylindrical spacer 42, having an outer diameter that is considerably greater than that of the hub section 26, is slidably mounted on the shaft 12 at a location between the adjacent knotter assemblies 18 and 20, and more specifically, between the right-hand face of the gear hub section 26' of one drive gear 22' and the left-hand face of the hub section 28' of the adjacent drive gear 22'. A right-hand face of the spacer 42 is engaged with a left-hand face of the hub section 28' of the gear 22' of the knotter assembly 20. A left-hand face of the spacer 42 contains a counterbore 44 in which is received a right-hand end portion of the hub section 26' of the gear 22' of the knotter assembly 18. The portion of this left-hand face that surrounds the hub section 26' is drilled and tapped to provide diametrically opposite threaded holes into which a pair of the jackbolts 38 is respectively screwed. The heads of the jackbolts 38 bear against a rightward facing surface of the drive gear 22'. A similar spacer 42 and jackbolts 38 are mounted between the gears 22' respectively of the knotter assembly 20 and the next adjacent knotter assembly to the right of the assembly 20. Thus, it will be appreciated that the spacer 42 provides adequate material for mounting the jackbolts 38, which by acting through the spacer 42, can adjust the spacing between the knotter assemblies 18 and 20. This adjustment operation is very similar to that where the jackbolts 38 are located in the hubs of the gears 22.

Figure 3:
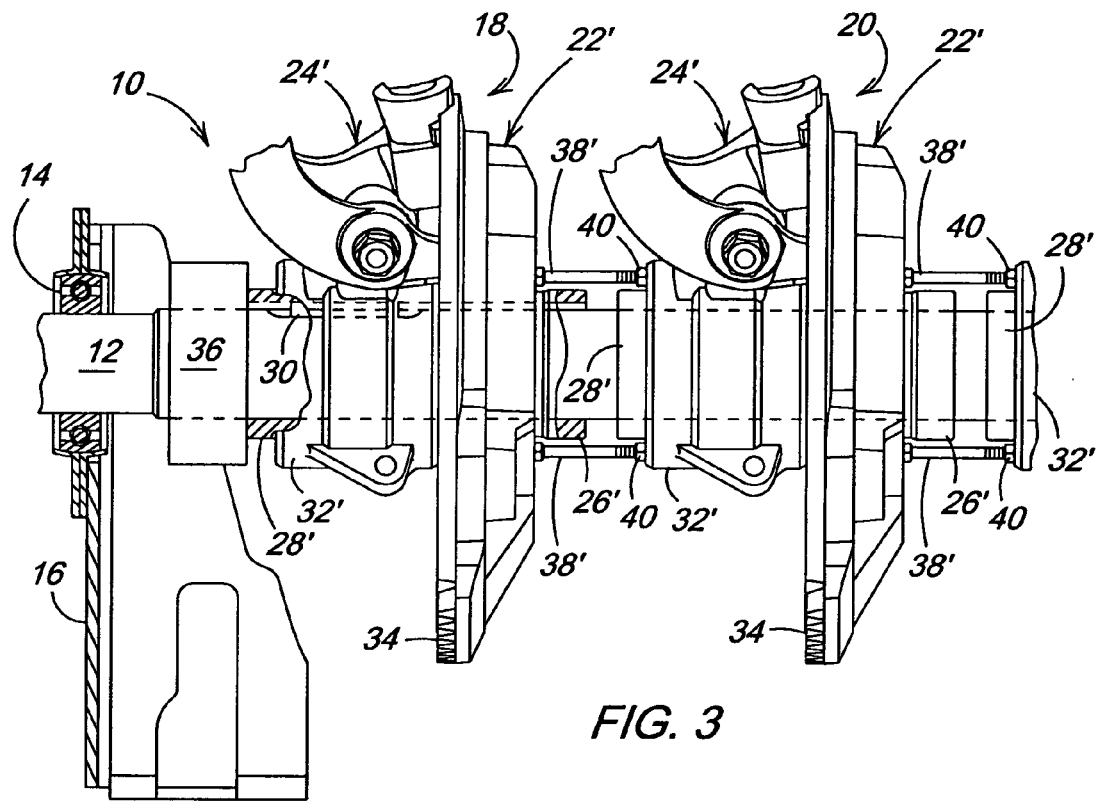

Referring to FIG. 3, there is shown a third embodiment of the invention having knotter gears 22', like those of FIG. 2, but omitting the spacers 42. Further, knotter frames 24' are provided which differ from the frames 24 by having sleeves 32' that have a larger outside diameter than the sleeves 32. A left-hand face of these sleeves is each provided with threaded holes, at diametrically opposite locations, and receives respective jackbolts 38', which are like the jackbolts 38, but longer, so as to span the space between the sleeve 32' and a right-hand face of the drive gear 22'.

Figure 4:
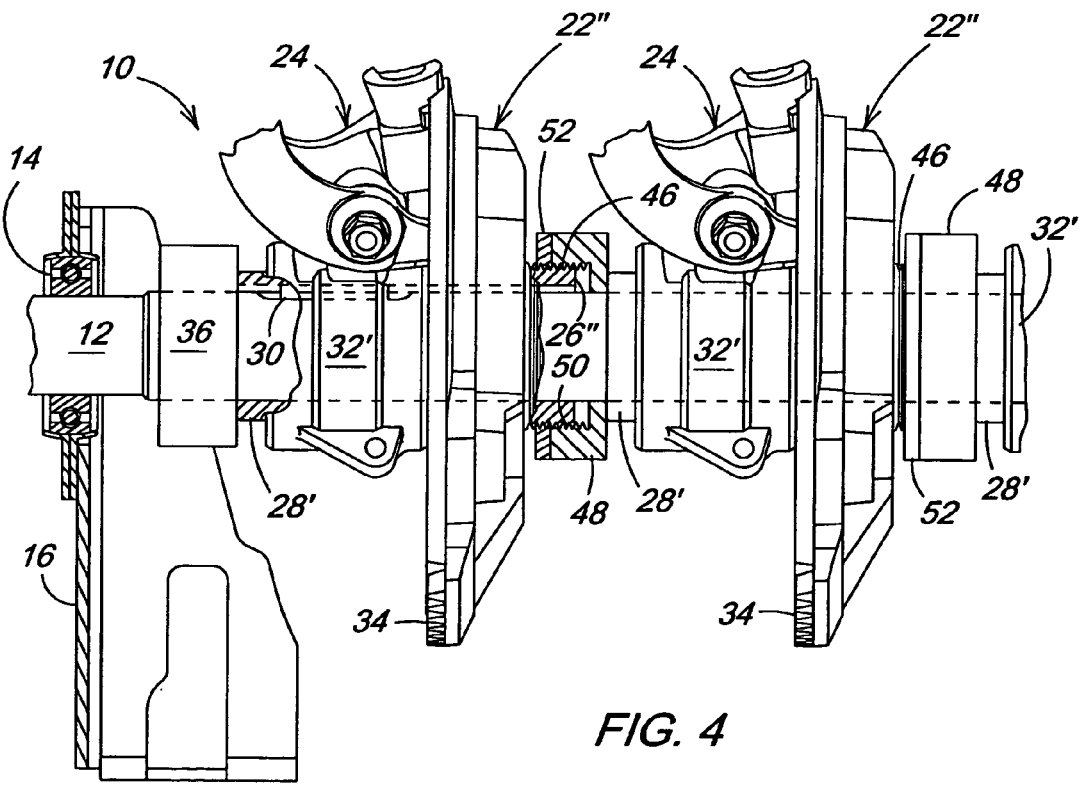

Referring to FIG. 4, there is shown a fourth embodiment of the invention including a plurality of drive gears 22", that are like the drive gears 22', except that the right-hand end of each hub section 26" is threaded, as at 46. A spacer 48, which is somewhat like the spacer 42 of FIG. 2 in that it is counterbored and received on the right-hand end portion of the hub section 26", is provided. However, instead of being slidably mounted on the hub section 26" of the gear 22", the counterbore is internally threaded, as at 50, and engaged with the threads 46 formed about the exterior of the right-hand end portion of the hub section 26". Thus, it will be appreciated that the spacing between adjacent drive gears can be adjusted by screwing the spacer 48 one way or the other about the hub section 26". A lock nut 52 is also received on the threads 46 of hub section 26" for being selectively tightened against the spacer 48 so as to secure it in place. Again, appropriate flats (not shown) are provided on both the spacer 48 and lock nut 52 for being engaged by a simple wrench during spacing adjustment.

Thus, it will be appreciated that the jackbolts 38, 38' provide a simple, effective, adjusting element that may act directly between adjacent knotter drive gears mounted on the knotter drive shaft, as shown in FIG. 1, may act through a spacer located on the knotter drive shaft between adjacent knotter assemblies, as shown in FIG. 2, or may act directly between the knotter frame and drive gear, as shown in FIG. 3.

Further, although not as economical of a solution as that of using jackbolts, it will be appreciated that the spacer 48, having a threaded connection with one end of the gear hub, as shown in FIG. 4, provides an axially threaded connection permitting a simple effective adjustment of the spacing between adjacent knotter assemblies.

Having described the preferred embodiment, it will become apparent that various modifications can be made without departing from the scope of the invention as defined in the accompanying claims.

What is claimed is:

1. In a knotter drive arrangement including a knotter drive shaft disposed along a drive axis, a plurality of knotter assemblies mounted to said shaft, with each knotter assembly including a drive gear having a hub mounted for rotation with, and axial movement along said shaft, and further including a knotter frame having a sleeve loosely mounted to one of said shaft and hub, and an adjustment mechanism spanning an axial gap between opposed surfaces of adjacent knotter assemblies and being selectively adjustable for spanning a greater or a lesser axial gap between said opposed surfaces of said adjacent knotter assemblies, the improvement comprising: said adjustment mechanism including at least one member mounted for axial threaded adjustment parallel to said drive axis for effecting changes in said axial gap spanned by said adjustment mechanism; and a locking device for releasably retaining said at least one member in a desired adjusted condition.

2. The knotter drive arrangement, as defined in claim 1, wherein said at least one member is a jackbolt threaded into one of said opposed surfaces and having a head engaged with another of said opposed surfaces.

3. The knotter drive arrangement, as defined in claim 2, wherein a second jackbolt is threaded into said one of said opposed surfaces at a location diametrically opposite from said at least one jackbolt.

4. The knotter drive arrangement, as defined in claim 2, wherein said locking device is a jam nut received on said at least one jackbolt.

5. The knotter drive arrangement, as defined in claim 1, wherein said opposed surfaces are respective ends of said hubs of said adjacent drive gears, respectively of said adjacent knotter assemblies.

6. The knotter drive arrangement, as defined in claim 1, wherein said opposed surfaces are respectively a surface of the drive gear of one of said knotter assemblies, and an end of the sleeve of the knotter frame of the adjacent knotter assembly; and said at least one member being at least one jackbolt threaded into the end of said sleeve and having a head engaged with said surface of said drive gear.

7. The knotter drive arrangement, as defined in claim 1, wherein said at least one member is defined by a spacer received on said shaft between said adjacent knotter assemblies, and at least one jackbolt screwed into an axial face of said spacer and having a head engaged with one of said opposed surfaces.

8. The knotter drive arrangement, as defined in claim 7, wherein said spacer extends radially beyond said hubs of said adjacent drive gears; and said at least one jackbolt being located radially outward of, and parallel to, one of said hubs.

9. The knotter drive arrangement, as defined in claim 1, wherein said at least one member is defined by a spacer located on said shaft between said adjacent knotter assemblies; one of said hubs of said adjacent knotter gears having a threaded exterior; and said spacer including an internally threaded counterbore received on said threaded exterior of said one of the hubs.

10. The knotter drive arrangement, as defined in claim 9, wherein said locking device is a nut located on said threaded exterior of said one of said hubs.

* * * * *